(12) United States Patent
Balogh et al.

(10) Patent No.: US 8,778,562 B2
(45) Date of Patent: Jul. 15, 2014

(54) METHOD OF DEPOSITING DURABLE THIN GOLD COATING ON FUEL CELL BIPOLAR PLATES

(75) Inventors: Michael P. Balogh, Novi, MI (US); Gayatri Vyas Dadheech, Bloomfield Hills, MI (US); Nicholas P. Irish, Milford, MI (US); Misle M. Tessema, Warren, MI (US); Daniel P. Miller, Victor, NY (US); Mahmoud H. Abd Elhamid, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 13/493,113

(22) Filed: Jun. 11, 2012

(65) Prior Publication Data

US 2013/0330654 A1    Dec. 12, 2013

(51) Int. Cl.
*H01M 8/02* (2006.01)
*C25D 5/50* (2006.01)
*C25D 15/00* (2006.01)
*H01M 8/00* (2006.01)

(52) U.S. Cl.
USPC ........... 429/518; 429/522; 429/535; 205/109; 205/224

(58) Field of Classification Search
USPC .................. 429/513, 518, 437, 455, 522; 204/290.03, 192.15; 205/109, 227, 224
See application file for complete search history.

(56) References Cited

U.S. PATENT DOCUMENTS

| 6,203,936 | B1 * | 3/2001 | Cisar et al. | 429/518 |
| 7,879,389 | B2 | 2/2011 | Vyas et al. | |
| 2008/0038619 | A1 * | 2/2008 | Takagi et al. | 429/34 |
| 2010/0035118 | A1 * | 2/2010 | Sato et al. | 429/34 |
| 2011/0008714 | A1 * | 1/2011 | Abd Elhamid et al. | 429/518 |
| 2011/0262825 | A1 * | 10/2011 | Shibuya | 429/455 |

FOREIGN PATENT DOCUMENTS

WO    WO 2010061694 A1 *   6/2010   .............. H01M 8/02

OTHER PUBLICATIONS

Zhou et al., "Formation of ultrafine uniform gold nanoparticles by sputtering and redeposition", Applied Physics Letters 94, 133107-113107-3, 2009.*
Stoian et al., "TEM, SEM, and AFM of polystyrene latex and gold nanoparticles", Oklahoma State University, Dec. 7, 2006. Retrieved online on Oct. 7, 2013 from: http://fp.okstate.edu/nanotech/Reports/Lab%20Reports/Lab_3_Team_6_Final.pdf.*
Woodman, A.S. et al.; Development of Corrosion-Resistant Coatings for Fuel Cell Bipolar Plates; AESF SUR/FIN '99 Proceedings; Jun. 21-24, 1999; pp. 1-9; American Electroplates and Surface Finishers Society.
Tawfik, H. et al.; Metal bipolar plates for PEM fuel cell—A review; Journal of Power Sources; Jan. 1, 2007; pp. 755-767; vol. 163; Elsevier B.V.

* cited by examiner

*Primary Examiner* — Kenneth Douyette
(74) *Attorney, Agent, or Firm* — Dinsmore & Shohl LLP

(57) ABSTRACT

A method of depositing a thin gold coating on bipolar plate substrates for use in fuel cells includes depositing a gold coating onto at least one surface of the bipolar plate substrate followed by annealing the gold coating at a temperature between about 200° C. to 500° C. The annealed gold coating has a reduced porosity in comparison with a coating which has not been annealed, and provides improved corrosion resistance to the underlying metal comprising the bipolar plate.

17 Claims, 4 Drawing Sheets

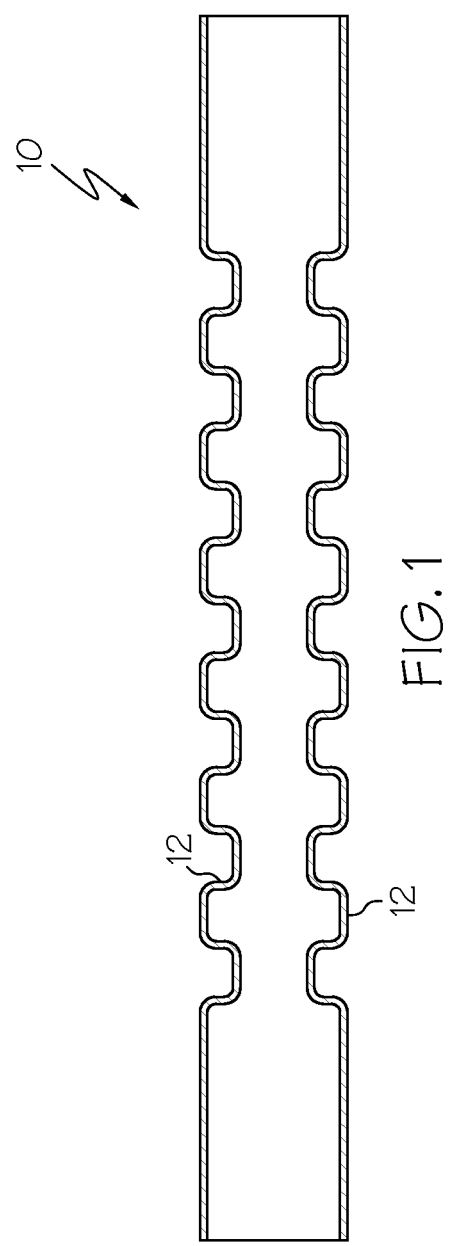

METHOD OF DEPOSITING DURABLE THIN GOLD COATING ON FUEL CELL BIPOLAR PLATES

BACKGROUND OF THE INVENTION

Embodiments of the invention relate to bipolar plates for fuel cells, and more particularly, to an improved method for depositing a thin gold coating on bipolar plates which reduces the porosity of the resulting gold coating, improves the durability of the gold coating, and reduces corrosion of the underlying bipolar plates.

In recent years, vehicle manufacturers have been increasingly pursuing fuel cell power sources due to their efficient operation and reduced emissions. A leading fuel candidate for use in transportation applications is a hydrogen/air proton exchange membrane fuel cell (PEMFC), which comprises a polymer membrane (e.g., a proton exchange membrane) that is positioned between a pair of gas diffusion media layers and catalyst layers. A cathode plate and an anode plate are positioned at the outermost sides adjacent the gas diffusion media layers. A catalytic coating is deposited on opposing sides of the membrane, forming a membrane electrode assembly (MEA). All of these components collectively form the cell unit.

Typically, several fuel cells are combined in a fuel cell stack to generate the desired electrical output. For an automotive fuel cell stack, the stack may include about two hundred or more fuel cells. In this arrangement, two adjacent cell units can share a common polar plate, which serves as the anode and the cathode for the two adjacent cell units it connects in series. Such a plate is commonly referred to as a bipolar plate, which typically includes a flow field therein to enhance delivery of the reactant gases, e.g., hydrogen and oxygen, to the associated cells.

Metallic bipolar plates are preferred for use because they are electrochemically stable, electrically conductive, and inexpensive. In addition, they can be made very thin (e.g., <0.25 mm) and can be formed into a final shape by inexpensive metal forming techniques, such as stamping. Stainless steel is commonly used to form bipolar plates. However, stainless steel is susceptible to corrosion in the humid fuel cell stack environment that includes both oxidizing and reducing conditions.

An active corrosion process in a fuel cell stack can increase the membrane resistance and the contact resistance of the bipolar plates, reducing the electrical conductivity/power density of the stack. The resulting corrosion products can also lead to chemical degradation of other fuel cell components. In order to protect the metal bipolar plates from corrosion and reduce contact resistance, the plates are often electroplated with a thin noble metal coating such as gold or a metal selected from the platinum metal group (PGM). The protective coatings are electrically conductive and have a thickness ranging from 5 to 10 nm. However, it has been found that even with the protective noble metal coatings, the underlying bipolar plates are subject to corrosion over time. Furthermore, the thin coatings suffer from significant degradation, especially on the cathode side of the fuel cell, where air enters the stack with pollutants such as iodide, bromide, chloride, thiosulfate, thiourea or mixtures thereof that have the potential of dissolving the coating, affecting the integrity of the bipolar plate over time.

SUMMARY OF THE INVENTION

Embodiments of the invention provide a method to improve the durability of thin gold coatings on stainless steel bipolar plates using a controlled annealing process. The annealed gold coating has a reduced porosity, which improves the stability of the coating and provides improved corrosion resistance to the underlying bipolar plate. It has also been found that the annealing process reduces the production of iron cations, which can adversely affect fuel cell performance due to membrane chemical degradation and loss of membrane ion exchange capacity.

According to one aspect of the invention, a method of depositing a gold coating onto a bipolar plate for a fuel cell is provided which comprises providing a bipolar plate substrate having first and second surfaces, depositing a gold coating onto at least one surface of the substrate, and annealing the gold coating on the substrate in a controlled environment. By "bipolar plate substrate," it is meant a bipolar plate or a substrate which is stamped onto or otherwise applied to a bipolar plate. For example, the gold coating may be applied directly to the bipolar plates or may be applied to a bipolar plate substrate in the form of a thin strip of metal which is then applied to the bipolar plate either before or after the annealing step.

In one embodiment, the gold coating is deposited by an electroplating process. The electroplated gold coating comprises nanoparticles having a particle size of from about 1 to 5 nm.

The electroplated gold coating is then preferably annealed at a temperature between about 200° C. to 500° C., and more preferably, at a temperature between about 250° C. to 300° C. The coating is preferably annealed in a dry, oxygen-free atmosphere. By "dry" and "oxygen-free," it is meant that the atmosphere contains less than 2 ppm oxygen and less than 2 ppm water. Preferably, the coating is annealed in the presence of hydrogen or an inert gas such as argon and/or helium.

The method preferably uses bipolar plate substrates comprised of stainless steel, but the substrates may also be comprised of other metals such as titanium, aluminum, and nickel-based alloys.

After annealing, the gold coating preferably has a thickness between about 3 nm and 10 nm and a particle size of about 10 to 30 nm. The annealed gold coating on both sides of the bipolar plate exhibits a total contact resistance of about 15 to about 22 mΩ-cm² at an applied compression of 200 psi and 1 A/cm² current density.

The annealed gold coating has a reduced porosity in comparison with the gold coating prior to annealing, and preferably exhibits a porosity which is less than about 1% by volume. The resulting bipolar plate including the annealed gold coating thereon is suitable for use in PEM fuel cells.

Accordingly, it is a feature of embodiments of the invention to provide a method of improving the durability of thin gold coatings on metallic bipolar plates for use in a PEM fuel cell assembly. Other features of the present invention will become apparent from the detailed description, and the appended claims.

BRIEF DESCRIPTION OF THE DRAWINGS

The following detailed description of specific embodiments of the present invention can be best understood when read in conjunction with the following drawings, where like structure is indicated with like reference numerals, where various components of the drawings are not necessarily illustrated to scale, and in which:

FIG. 1 is a schematic illustration of a bipolar plate including a gold coating thereon according to an embodiment of the present invention;

DETAILED DESCRIPTION

Figure 2A:
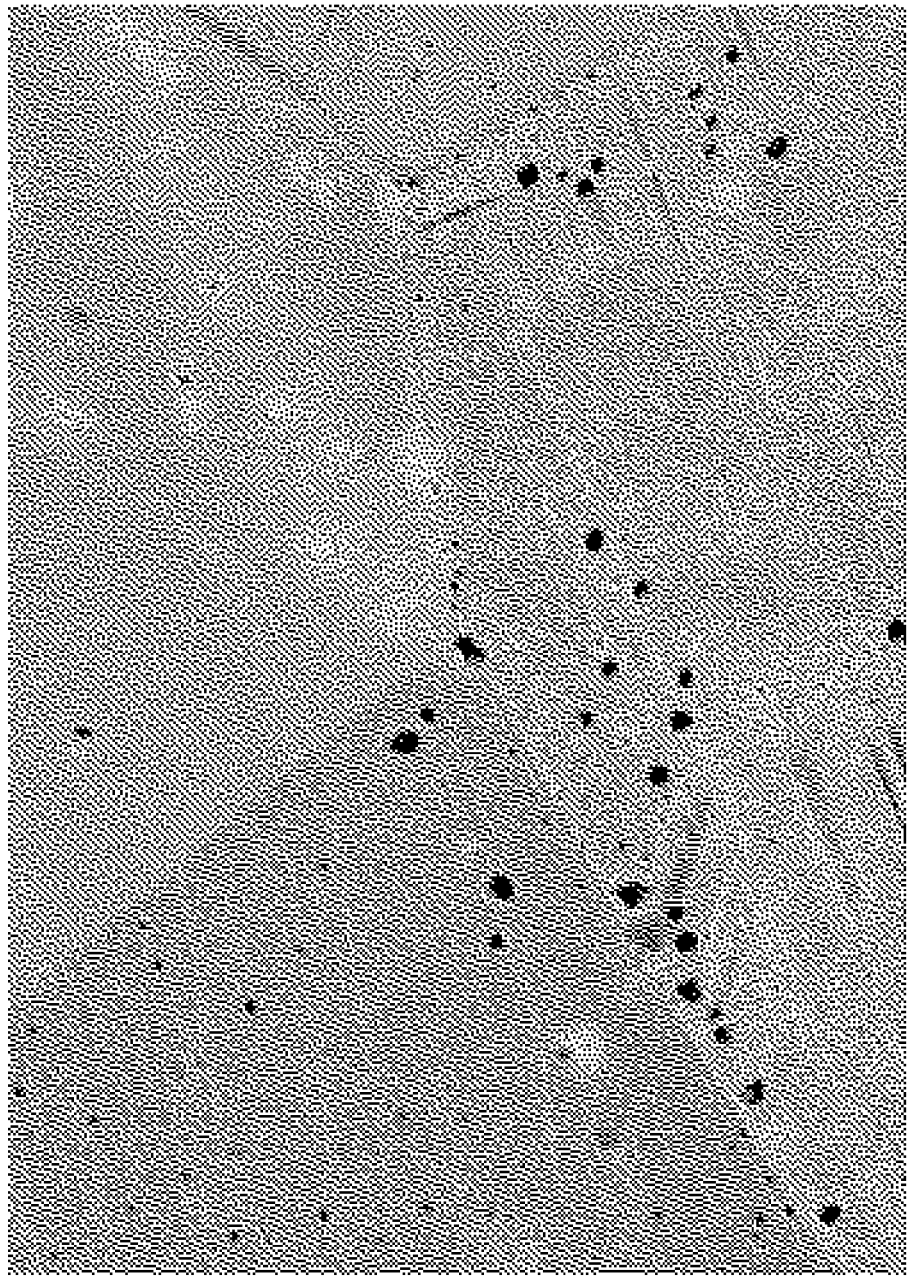
FIGS. 2A and 2B are illustrations representing scanning electron microscope (SEM) images of a gold plated bipolar plate before and after annealing.

While gold coatings on metallic bipolar plates have been shown to improve corrosion resistance, it has been found that the bipolar plates are still subject to corrosion over time. Further, the gold coating itself is prone to degradation as a result of air contamination on the cathode side of the fuel cell as well as from contaminants such as bromides, iodides, chlorides, thiosulfates, and thiourea which could potentially degrade the coating, reducing its adhesion to the plate and increasing the plate resistance over time. Without wishing to be bound by theory, it is believed that one of the reasons for corrosion is the high porosity of the thin (5 to 10 nm) electrolytically deposited gold coating. This high porosity of the thin gold coatings allows corrosion of the underlying metal/stainless steel plate during fuel cell operation, resulting in coalescence of the gold film/coating and the formation of hydrated iron oxides, which contribute to corrosion and reduced conductivity and the release of iron ions in the fuel cell environment which have a detrimental effect on the membrane durability.

By depositing a thin gold coating on the surface of a bipolar plate substrate which is subsequently exposed to annealing conditions, the resulting gold coating has a reduced porosity and better adhesion to the stainless steel substrate. This improves the stability of the gold layer on the plate surface, maintains good contact resistance of the coating, reduces corrosion of the bipolar plates, reduces introduction of corrosive compounds such as iron oxides into the coating, and in turn reduces the release of iron ions in the fuel cell environment.

We have also found that the annealing process reduces the lattice parameter of the gold coating, improving the overall coating structure by relieving internal stress, which also improves the cold working properties and ductility of the coating. For example, when annealed at a temperature of about 230° C., the lattice parameter is about 4.07 Å. At an annealing temperature of about 500° C., the lattice parameter is about 4.02 Å, and at 650° C., the lattice parameter is about 3.95 Å. The crystal size also increases with annealing temperature. At a temperature of 230° C., the crystal size is from about 12.23 to 12.48 nm; at 500° C., the crystal size is about 15.14 to 15.40 nm; and at 650° C., the crystal size is about 15.40 to 16.02 nm.

Unless otherwise indicated, the disclosure of any ranges in the specification and claims are to be understood as including the range itself and also anything subsumed therein, as well as endpoints.

Referring now to FIG. 1, a gold coated and annealed bipolar plate 10 is shown in accordance with an embodiment of the invention. The bipolar plate 10 preferably comprises ferritic or austenitic stainless steel, but may be comprised of other metallic materials including aluminum, titanium, titanium alloys, nickel-based alloys, and iron-based alloys. As shown, the bipolar plate 10 includes a thin gold coating 12 on both surfaces of the plate.

The gold coating 12 is preferably deposited on the bipolar plate by an electroplating process using a bath which contains a solution of gold in hydrochloric acid/cyanide. A preferred solution for use in the invention is Goldbond TCL, commercially available from Grauer & Weil (India) Ltd., which comprises gold, a base metal, and hydrochloric acid. The application of Goldbond TCL is referred to as an acid gold strike process which is intended for use on stainless steel, but which may also be used on metals such as nickel.

The electroplated gold coating is essentially comprised of gold nanoparticles. The particle size and shape may vary, depending on the electroplating bath parameters such as pretreatment, temperature, and current density. After electroplating, the gold nanoparticles are typically from about 1 to 12 nm in size, and after annealing, the particle size is from about 15 to 30 nm.

The gold coating solution is preferably applied in a continuous roll process where a thin, rolled coil of metal such as a stainless steel foil is continuously fed into the bath containing the gold solution so that it becomes coated with a thin layer of gold. The resulting gold coating consists of pure gold with other ingredients contributing less than 0.01 wt % of the coating. The gold coating is then dried on the foil and subsequently placed into a furnace and subjected to annealing conditions.

The annealing process preferably takes place in a dry, oxygen-free atmosphere to prevent thermal oxidation of the stainless steel and to prevent the formation of iron and chromium oxides. The coating is preferably annealed in an argon atmosphere, but hydrogen and other inert gases excluding nitrogen are also suitable for use. The coating may also be annealed under vacuum conditions. The coating is preferably annealed at a temperature between about 200° C. to 500° C., and more preferably, at a temperature between about 250° C. to 300° C. It should be noted that at temperatures above 400° C., recrystallization is initiated in the coating. At temperatures of 500° C. or greater, the gold coating may alloy with the stainless steel substrate. While alloying provides good adhesion of the gold coating to the stainless steel, the contact resistance may be reduced if deep surface alloying occurs, such as with annealing temperatures over 600° C.

After the annealing process, the gold coated foil may be stamped onto one or both surfaces of a bipolar plate using conventional techniques, such as the use of a stamping die. Alternatively, the gold coated foil may be stamped onto the bipolar plates directly after electroplating followed by stacking the plates in a furnace/oven and annealing.

Figure 2B:

Referring now to FIGS. 2A and 2B, the effect of annealing on the gold coating is illustrated. FIG. 2A is a representation of a scanning electron microscope (SEM) image of a gold coating on a stainless steel bipolar plate after electroplating but prior to annealing. As can be seen, the surface of the coating has a number of visible pores. FIG. 2B is an SEM of the same gold coating after annealing, and illustrates a significant reduction in porosity. Prior to annealing, the porosity is about 15 to 20% by volume and is reduced upon annealing to less than about 1% by volume. The annealed gold coating on the bipolar plate exhibits a contact resistance of about 15 to 22 m$\Omega$-cm$^2$.

Figure 3:
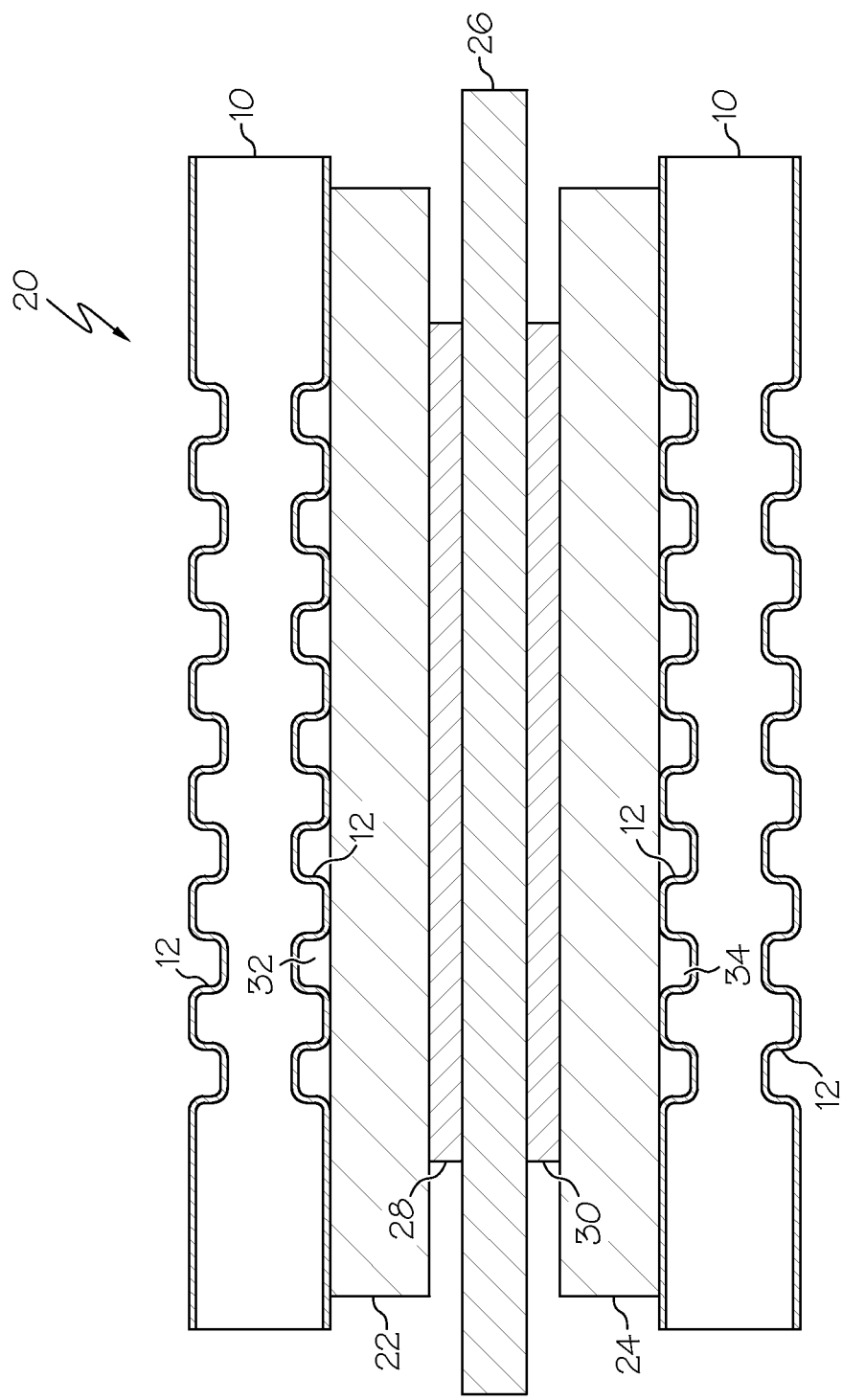
FIG. 3 is a schematic illustration of gold coated bipolar plates in a fuel cell assembly according to an embodiment of the present invention.

Referring now to FIG. 3, a cross-sectional view of a fuel cell assembly 20 according to an embodiment of the invention is illustrated which includes gold coated bipolar plates 10. The fuel cell assembly may be part of a fuel stack as discussed above. The fuel cell 20 includes gas diffusion layers comprising an anode side 22 and a cathode side 24 which are separated by a perfluorosulfonic acid membrane 26 and anode and cathode catalyst layers 28 and 30, respectively. The catalyst layers 28 and 30 and the membrane 26 define a membrane electrode assembly (MEA). The diffusion layers 22 and 24 are porous layers that provide for input gas transport to the MEA and water transport from the MEA. Although the invention is not limited to any specific reactant compositions, it will be appreciated by those skilled in the art that the reactants typically comprise oxygen and hydrogen.

As shown, the bipolar plates 10 contact the gas diffusion layers 22, 24 on the anode and cathode sides of the fuel cell 20. A hydrogen reactant gas flows from flow channels 32 in the bipolar plate which react with the anode catalyst layer 28 to dissociate the hydrogen ions to generate free protons and electrons. Airflow (oxygen) from flow channels 34 in the bipolar plate react with the protons and cathode catalyst layer 30, generating water as an end product, which is desirable as it does not have a negative impact on the environment.

It should be appreciated that a variety of conversion assembly configurations may be used as long as the assembly utilizes one or more bipolar plates 10 between some or all of the respective fuel cells 20.

Bipolar plates according to embodiments of the invention typically define a thickness of about 75 to 100 μm, while the corrosion resistant gold coating layers have a thickness of between about 3 nm and about 10 nm.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of depositing a gold coating onto a bipolar plate for a fuel cell comprising:
   providing a bipolar plate substrate having first and second surfaces;
   depositing a gold coating onto at least one surface of said substrate; wherein said coating consists essentially of gold nanoparticles; and
   annealing said gold coating on said substrate; wherein said annealed gold coating has a reduced porosity in comparison with said gold coating prior to annealing.

2. The method of claim 1 wherein said gold coating comprises nanoparticles having a particle size of about 1 to 12 nm.

3. The method of claim 1 wherein said bipolar plate substrate comprises stainless steel.

4. The method of claim 1 wherein said gold coating is annealed at a temperature between about 200° C. to 500° C.

5. The method of claim 1 wherein said gold coating is annealed at a temperature between about 250° C. to 300° C.

6. The method of claim 3 wherein said gold coating forms an alloy with said stainless steel at annealing temperatures ≥500° C.

7. The method of claim 1 wherein said coating is annealed in a dry, oxygen-free atmosphere.

8. The method of claim 1 wherein said coating is annealed in the presence of hydrogen or an inert gas.

9. The method of claim 8 wherein said coating is annealed in the presence of argon.

10. The method of claim 1 wherein said annealed gold coating has a thickness between about 3 nm and 10 nm.

11. The method of claim 1 wherein said annealed gold coating comprises nanoparticles having a particle size of about 15 to 30 nm.

12. The method of claim 1 wherein said annealed gold coating on said bipolar plate substrate exhibits a contact resistance of about 15 to about 22 mΩ-cm$^2$ at an applied compression of 200 psi and current density of 1 A/cm$^2$.

13. The method of claim 1 wherein said annealed gold coating has a porosity less than about 1% by volume.

14. The method of claim 1 wherein said annealed gold coating exhibits a reduced lattice parameter in comparison with said gold coating prior to annealing.

15. A bipolar plate for use in a fuel cell, said bipolar plate including an annealed gold coating thereon consisting essentially of gold nanoparticles and having a porosity of less than about 1% by volume.

16. The bipolar plate of claim 15 wherein said annealed gold coating exhibits a contact resistance of about 15 to about 22 mΩ-cm$^2$ at an applied compression of 200 psi and current density of 1 A/cm$^2$.

17. The bipolar plate of claim 15 comprising stainless steel.

* * * * *